(12) United States Patent
Wang et al.

(10) Patent No.: US 10,705,023 B2
(45) Date of Patent: Jul. 7, 2020

(54) SOLUTION CATHODE GLOW DISCHARGE PLASMA-ATOMIC EMISSION SPECTRUM APPARATUS AND METHOD CAPABLE OF PERFORMING DIRECT GAS SAMPLE INTRODUCTION AND USED FOR DETECTING HEAVY METAL ELEMENT

(71) Applicant: SHANGHAI INSTITUTE OF CERAMICS, CHINESE ACADEMY OF SCIENCES, Shanghai (CN)

(72) Inventors: Zheng Wang, Shanghai (CN); Chuchu Huang, Shanghai (CN); Qing Li, Shanghai (CN); Jiamei Mo, Shanghai (CN)

(73) Assignee: SHANGHAI INSTITUTE OF CERAMICS, CHINESE ACADEMY OF SCIENCES, Shanghai (CN)

( * ) Notice: Subject to any disclaimer, the term of this patent is extended or adjusted under 35 U.S.C. 154(b) by 141 days.

(21) Appl. No.: 16/065,669

(22) PCT Filed: Dec. 30, 2016

(86) PCT No.: PCT/CN2016/113504
§ 371 (c)(1),
(2) Date: Jun. 22, 2018

(87) PCT Pub. No.: WO2017/114488
PCT Pub. Date: Jul. 6, 2017

(65) Prior Publication Data
US 2018/0372646 A1 Dec. 27, 2018

(30) Foreign Application Priority Data

Dec. 31, 2015 (CN) .......................... 2015 1 1015846
Mar. 29, 2016 (CN) .......................... 2016 1 0186496

(51) Int. Cl.
*G01N 21/67* (2006.01)
*H05H 1/48* (2006.01)
(Continued)

(52) U.S. Cl.
CPC ................ *G01N 21/67* (2013.01); *G01J 3/10* (2013.01); *G01J 3/443* (2013.01); *H05H 1/46* (2013.01);
(Continued)

(58) Field of Classification Search
CPC ....................................................... G01N 21/67
(Continued)

(56) References Cited

U.S. PATENT DOCUMENTS 7,746,451 B1 * 6/2010 Wilson ................. G01N 21/645
356/72
2003/0103205 A1 * 6/2003 Gianchandani ........ G01N 21/67
356/311

(Continued)

FOREIGN PATENT DOCUMENTS

| CN | 101344483 A | 1/2009 |
| CN | 103163116 A | 6/2013 |

(Continued)

OTHER PUBLICATIONS

Jiang et al., "Design and Application of Atmospheric Sampling Glow Discharge Ionization Mass Spectrometer," Chinese Journal of Analytical Chemistry, vol. 40, No. 4, Apr. 30, 2012, 5 pages.
(Continued)

*Primary Examiner* — Tarifur R Chowdhury
*Assistant Examiner* — Omar H Nixon
(74) *Attorney, Agent, or Firm* — Alleman Hall Creasman & Tuttle LLP

(57) ABSTRACT

A solution cathode glow discharge plasma-atomic emission spectrum apparatus and method capable of performing direct
(Continued)

gas sample introduction and used for detecting a heavy metal element. The solution cathode glow discharge plasma-atomic emission spectrum apparatus comprises a high-voltage power source, a ballast resistor, a hollow metal anode and a solution cathode. The hollow metal anode is connected to a positive electrode of the high-voltage power source by means of the ballast resistor, and the solution cathode is connected to a negative electrode of the high-voltage power source by means of a graphite electrode. The plasma apparatus is further configured in such a manner that a discharge region is formed between the hollow metal anode (10) and the solution cathode, and the hollow metal anode further serves as a sample introduction pipeline, so that gas to be detected enters the discharge region and is excited.

12 Claims, 7 Drawing Sheets

(51) Int. Cl.
*G01J 3/10* (2006.01)
*G01J 3/443* (2006.01)
*H05H 1/46* (2006.01)
(52) U.S. Cl.
CPC ....... *H05H 1/48* (2013.01); *H05H 2001/4697* (2013.01)
(58) Field of Classification Search
USPC ......................................................... 356/316
See application file for complete search history.

(56) References Cited

U.S. PATENT DOCUMENTS

| | | | |
|---|---|---|---|
| 2005/0012038 A1 | 1/2005 | Marcus et al. | |
| 2006/0278585 A1* | 12/2006 | Cocking | C02F 1/4674 204/242 |
| 2009/0229972 A1* | 9/2009 | Sankaran | C23C 14/165 204/192.32 |
| 2009/0278038 A1 | 11/2009 | Baumbach et al. | |
| 2014/0218729 A1* | 8/2014 | Marcus | H01J 49/105 356/316 |
| 2014/0227176 A1* | 8/2014 | Marc-Andre | A61K 49/1863 424/1.29 |

FOREIGN PATENT DOCUMENTS

| | | | |
|---|---|---|---|
| CN | 103237406 A | 8/2013 | |
| CN | 103969243 A | 8/2014 | |
| CN | 104089945 A | 10/2014 | |
| CN | 104237178 A | 12/2014 | |
| CN | 204154649 U | 2/2015 | |
| CN | 105651760 A | 6/2016 | |
| CN | 105842230 A | 8/2016 | |
| JP | 04206135 A | 7/1992 | |
| JP | 3987855 B2 | 10/2007 | |

OTHER PUBLICATIONS

ISA State Intellectual Property Office of the People's Republic of China, International Search Report Issued in Application No. PCT/CN2016/113504, dated Mar. 31, 2017, WIPO, 3 pages.

* cited by examiner

| Materials | Certified | | Found | |
|---|---|---|---|---|
| | Se (IV) | Se (VI) | Se (IV) | Se (VI) |
| CGSE (6) 1 | 0.038±0.001 | 0.204±0.001 | 0.036±0.006 | 0.203±0.006 |

Table 1

FIG. 7

SOLUTION CATHODE GLOW DISCHARGE PLASMA-ATOMIC EMISSION SPECTRUM APPARATUS AND METHOD CAPABLE OF PERFORMING DIRECT GAS SAMPLE INTRODUCTION AND USED FOR DETECTING HEAVY METAL ELEMENT

FIELD OF THE INVENTION

The present invention belongs to the field of atomic spectrometry, relates to a microplasma apparatus, and more particularly relates to a microplasma apparatus, a heavy metal element detecting apparatus with the microplasma apparatus, and a method using the same.

BACKGROUND OF THE INVENTION

Traditional metal element analysis methods include atomic absorption spectrometry, inductively coupled plasma atomic emission spectrometry/mass spectrometry, etc. The detecting instruments used in these methods are expensive and bulky, the detection procedures are cumbersome, and the detection costs are high. With the development of science and technology and improvement in detection level, people began to study simple, rapid, and low-cost detection technology for metal elements.

Microplasma is a general term for plasmas with dimensions on the order of millimeters or less. The micro-discharge plasma can usually operate under atmospheric pressure, usually without any special gas, and thus its operating cost is low and the instrument therefor is small in size. The solution cathode glow discharge device is such a device that, at atmospheric pressure, the sample solution acts as a cathode and the metal rod acts as an anode. By applying a high voltage between the electrodes, gas discharge is generated between the electrodes. During the discharge process, the solution of the solution electrode is continuously vaporized, so that the metal ions dissolved in the solution also enter into the plasma and are excited to generate spectral radiation, and thus the detection of metal ions in the solution can be realized, in combination with a spectrometer. It not only has the advantages such as low cost as atomic absorption spectrometry, high flux, multi-element, and high sensitivity as emission spectrometry, but also has the advantages such as having a simple structure, small size, low power consumption, the ability to operate under atmospheric pressure, no requirement for a nebulizer or vacuum system, and ease of miniaturization and on-line analysis. Therefore, it is widely used in the field of atomic spectrometry.

The sample is introduced into the solution cathode glow discharge device in the form of a liquid. That is, the liquid sample is introduced into the glass capillary via the sample introduction tube by the peristaltic pump and overflows. The sample introduction method is simple and only liquid samples can be tested; moreover, since the pH of the cathode liquid must be 1, the requirements for pretreatment of the sample are strict, which severely restricts its application in the analysis field. At the same time, the nebulization efficiency of the elements in the solution to be measured is low in the plasma evaporation, and the sensitivity of element to be measured is reduced. Therefore, to improve its sample introduction method, especially to achieve gas sample introduction, can not only simplify the sample pre-treatment process and broaden the application of micro-plasma, but also improve its test sensitivity, and provide the possibility for use in combination with other instruments.

Conventional spectroscopic-based metal ion detection methods mainly include atomic absorption spectrometry and atomic emission spectrometry. The detecting instruments commonly used in these methods include flame atomic absorption spectrometry, inductively coupled plasma emission spectrometry, and the like. However, these commonly used detecting instruments are bulky, expensive, and have high detection costs and are difficult to use for field analysis and monitoring. With the development of technology and improvement in detection levels, people began to study simple, rapid, and low-cost metal element detection technology, in order to achieve rapid and effective monitoring of metal residues in the environment to protect public health and ecological security.

Solution cathode glow discharge spectrometry detection technology has the advantages of simple structure, small size, low operating power consumption, ability to operate under normal pressure, no nebulizer, no vacuum system, easy realization of miniaturization and on-line analysis, etc., and is promising for application in metal ion detection in various fields such as geology, environmental protection, materials science, food safety, water purification, etc.

Although solution cathode glow discharge spectrometry has relatively low detection limits for most elements, such as Li, Na, etc., it has low sensitivity to most heavy metal elements, especially toxic heavy metal elements, such as Se, Te, Hg, As, Sb, Bi, Pb, etc. At present, scientists have improved the sensitivity of certain elements by adding small-molecule organic acids or surfactants and achieved good results. However, there are still problems as follows: on one hand, the improvement of sensitivity is limited, it only has a good effect on some elements, while it is still not universally suitable for many toxic heavy metal elements, and it cannot fully meet the needs of environmental monitoring; on other hand, although elemental morphology analysis can be performed by methods such as liquid chromatography separation or solid-phase separation of new materials, the process is relatively complicated and the cost is relatively high.

The use of chemical reactions to form volatile gases from the analyte is not only an effective way to increase the sensitivity and selectivity of the analytical method, but also a special technique. Among them, the most advanced is the hydride generation technology, which is combined with conventional instrument detection methods such as inductively coupled plasma emission spectrometry and graphite furnace atomic absorption spectrometry, to achieve gas sample introduction.

Compared with the conventional sample introduction method, the hydride generation sample introduction technique enables the component to be measured to be separated from the matrix in the form of gas, reducing the matrix interference, and enriching the element to be measured, so that the sample introduction efficiency increases to nearly 100% from <5% in the case of pneumatic nebulization; at the same time, the easy dissociation of gas hydride greatly improved the atomization efficiency, and thus the detection limit and precision during measurement can be greatly improved, and the morphological analysis and simultaneous detection of multiple elements can be realized.

SUMMARY OF THE INVENTION

In order to overcome the deficiencies of the existing apparatuses, the technical problem to be solved by the present invention is to provide a microplasma apparatus suitable for analysis of metal elements in gas, which is simple in structure, small in size, convenient in operation, and low in cost, and can realize gas direct sample introduction and improve the sensitivity of metal element analysis.

In order to solve the above technical problem, the technical solution adopted by the present invention is:

A microplasma apparatus suitable for analysis of metal elements in gas is provided, which comprises a high-voltage power supply, a ballast resistor, a hollow metal anode and a solution cathode; the hollow metal anode being connected to a positive electrode of the high-voltage power supply by means of the ballast resistor, and the solution cathode being connected to a negative electrode of the high-voltage power supply by means of a graphite electrode; and the microplasma apparatus being further configured in such a manner that a discharge region is formed between the hollow metal anode and the solution cathode, and the hollow metal anode also serves as a sample introduction pipe so that the gas to be tested enters the discharge region and is excited.

According to the present invention, a microplasma apparatus suitable for analysis of metal elements in gas has the following beneficial effects: simple structure, compact size, convenient installation and operation, low operation power consumption, low cost, and direct gas sample introduction, and can improve the sensitivity of metal element analysis. The microplasma apparatus of the invention can operate under atmospheric pressure, does not require a nebulizer, does not need a vacuum system, is easy to realize miniaturization, performs sample introduction in the form of gas without affecting its plasma stability, has high metal element analysis sensitivity, is suitable for analysis of metal elements in gas, and provides possibilities for use in combination with other instruments.

Preferably, the hollow metal anode is a hollow titanium tube.

Preferably, the gas to be tested is carried by an inert gas as a carrier gas into the hollow metal anode. The inert gas has a cooling effect on the hollow titanium tube anode and can prevent the anode from overheating and damaging. The carrier gas flow is preferably 50-150 mL/min. The inert gas may be argon or helium.

In the present invention, it is preferable that the solution cathode is an electrolyte solution introduced into a cathode capillary tube through a peristaltic pump and overflows the cathode capillary tube; and the top end of the cathode capillary tube is kept at a distance of 3 to 4 mm from the bottom end of the hollow metal anode.

Because the gas sample introduction is realized, it not only simplifies the sample pretreatment process and broadens the application field of microplasma, but also improves the testing sensitivity and provides the possibility for use in combination with other instruments.

Preferably, the microplasma apparatus suitable for analysis of metal elements in gas according to the present application further comprises a waste reservoir located beneath the hollow metal anode; the graphite electrode horizontally penetrates a wall of the waste reservoir and is fixed to one side of the waste reservoir; and the cathode capillary tube vertically penetrates the graphite electrode.

More preferably, the waste liquid in the waste reservoir is led out through the waste tube by the peristaltic pump that introduces the electrolyte solution into the cathode capillary tube.

Preferably, in the present invention, the cathode capillary tube is a glass capillary with an inner diameter of 0.38 mm and an outer diameter of 1.1 mm; the waste tube has an inner diameter of 2-3 mm and an outer diameter of 4-5 mm; the hollow metal anode has an inner diameter of 0.8-1.0 mm and an outer diameter of 2.0-2.5 mm; the peristaltic pump is adjusted to provide a liquid cathode flow rate of 1.0-2.1 mL/min; and the flow rate of the gas to be tested is adjusted to 50-150 mL/min.

In the present invention, it is preferable that the high-voltage power supply adopts a high-voltage source capable of supplying 0-2000 V DC voltage with a rated current of 0.1 A; and the ballast resistor has a resistance of 1-1.2 k$\Omega$.

Preferably, the hollow metal anode and the waste reservoir are fixed on a three-dimensional platform with adjustable X, Y, and Z directions and an accuracy of 2 $\mu$m.

In the present invention, the peristaltic pump is an ordinary laboratory peristaltic pump. The types of peristaltic pumps, anode materials, and carrier gases are not limited thereto.

The advantages of the present invention are:

The apparatus is simple, has a small volume, is convenient to install, consumes low power for running, is operated at atmospheric pressure, requires no nebulizer, requires no vacuum system, easily achieves miniaturization, performs sample introduction in the form of gas, does not affect plasma stability thereof, has high sensitivity in metal element analysis, and is applicable to the analysis of a metal element in gas.

On the other hand, to overcome the deficiencies of the existing heavy metal element detecting apparatuses and methods, another technical problem to be solved by the present invention is to provide an apparatus and a method for heavy metal elements detection which is simple in structure, convenient in operation, low cost, and can perform easy, quick, and real-time detection of heavy metal elements and improve the sensitivity to and selectivity of heavy metal elements.

In order to solve the above technical problem, the technical solution adopted by the present invention is:

In one aspect, an apparatus for detecting heavy metal elements is provided, comprising: a hydride generator unit, a solution cathode glow discharge spectrometer unit, and a connecting unit connecting the hydride generator unit and the solution cathode glow discharge spectrometer unit; wherein the solution cathode glow discharge spectrometer unit is configured in such a manner that an electrolyte solution serves as the cathode and a hollow titanium tube serves as the anode, and glow discharge microplasma is generated between the two electrodes after a high voltage is applied to the two electrodes, the hydride generator unit generates a hydride of the heavy metal element to be detected from the test sample, and the hydride of the heavy metal element to be detected generated by the hydride generator unit is sent to the hollow titanium tube anode via the connecting unit, and is led from the hollow titanium tube anode to the glow discharge microplasma and is excited, and thus a characteristic emission spectrum is generated.

The apparatus for detecting heavy metal elements of the present invention is an apparatus combining a hydride generator with a solution cathode glow discharge spectrometer to realize ion detection of heavy metal elements, especially toxic heavy metal elements, in water, biological, and ore samples, and improves the sensitivity of analysis as well as expands the selectivity of heavy metal elements, especially toxic heavy metal elements, in solution cathode glow discharge spectrometry.

The apparatus of the present invention combines the advantages of the solution cathode glow discharge spectrometer and the hydride generator. The apparatus has the advantages of simple structure, convenient installation, convenient operation, and low cost, which laid the foundation for the combination of the solution cathode glow discharge spectrometer with other sample introduction technologies, and broadened the application prospects of the actual sample analysis of the solution cathode glow discharge spectrometer.

In the present invention, the hydride generator unit may include: a sample introduction system, a reaction zone for generating the hydride of the heavy metal element to be tested by reacting the reaction solution delivered by the sample introduction system, a gas-liquid separator for separation of the hydride of the heavy metal element to be tested from the reacted liquid, and a carrier gas flow control system for controlling a carrier gas for carrying the hydride of the heavy metal element to be tested.

The connecting unit may include a hydride output tube connected between the top of the hollow titanium tube anode of the solution cathode glow discharge spectrometer and the gas-liquid separator of the hydride generator.

Preferably, the hydride output tube is a plastic flexible hose with an inner diameter of 0.3-0.35 cm and an outer diameter of 0.38-0.43 cm.

Preferably, the sample introduction system includes a peristaltic pump, a sample conduit, a reducing agent conduit, and a carrier solution conduit; the sample to be tested, the reducing agent, and the carrier solution are introduced into the reaction zone through the peristaltic pump via the sample conduit, the reducing agent conduit, and the carrier solution conduit, respectively; and the carrier gas flow control system includes a carrier gas conduit, and a gas flow controller for controlling the gas flow within the carrier gas conduit.

In the present invention, preferably, the solution cathode glow discharge spectrometer unit includes a light source generating part, a spectroscopic system, a detecting apparatus, and a data processing system, wherein the light source generating part includes a high-voltage power supply, a hollow titanium tube anode and a graphite electrode that are connected to the positive and negative electrodes of the high-voltage power supply, respectively, a waste reservoir under the hollow titanium tube anode, a sidewall of which is penetrated by the graphite electrode horizontally, a cathode capillary tube that vertically penetrates the graphite electrode, a waste tube for draining the waste liquid from the waste reservoir, and a peristaltic pump for introducing electrolyte to the cathode capillary tube or introducing the waste liquid to the waste tube; and wherein the spectroscopic system includes a condenser lens and a spectrometer, the center of the glow discharge region that generates the glow discharge microplasma, the center of the condenser lens, and the center of the entrance slit of the spectrometer being on the same line.

In addition, the present invention also provides a method for detecting heavy metal elements using the apparatus for detecting heavy metal elements of the present invention. The method includes the following steps:

Providing a sample solution, a carrier solution, and a reducing agent solution, and making them react in the hydride generator unit to generate a gas hydride;

Introducing the generated gas hydride into the hollow titanium tube anode of the solution cathode glow discharge spectrometer by the carrier gas;

Overflowing the electrolyte solution continuously from the top of cathode capillary tube of the solution cathode glow discharge spectrometer unit;

Applying a high voltage to the electrolyte solution serving as the cathode and the hollow titanium tube serving as the anode in the solution cathode glow discharge spectrometer unit under atmospheric pressure such that the gas hydride is excited, thereby generating a characteristic emission spectrum;

Selecting an appropriate object distance within the range of presenting real images, introducing the characteristic emission spectrum line generated into the spectrometer by the lens, and detecting the content of heavy metal elements in the sample solution to be tested to realize detection of heavy metal element ions.

Preferably, in the method, the reducing agent solution is sodium borohydride or potassium borohydride solution, and the carrier solution is electrolyte acid.

Preferably, the carrier gas used is an inert gas.

The heavy metal elements to be tested in the present method include Se, Te, Hg, As, Sb, Bi, Pb, and Sn in water, biological, and ore samples.

The method of the present invention includes a method for detection and valence state analysis of heavy metal elements in a sample under normal pressure by using a combination of a solution cathode glow discharge spectrometer driven by a direct current and a hydride generator, which is simple in operation process, easy to implement, combines the advantages of solution cathode glow discharge and hydride generation, can simplify the sample pretreatment process, reduce the matrix effect, can improve the detection sensitivity of the heavy metal elements, and expand the selectivity, and can achieve the detection of hydride-forming elements such as Se, Te, Hg, As, Sb, Bi, Pb, and Sn in the water, biological, and ore samples, as well as the analysis of the valence states of elements such as As, Se, and Hg.

Advantageous Effect of the Invention

The apparatus of the present invention is simple, has a small volume, is convenient to install, consumes low power for running, is operated at atmospheric pressure, requires no nebulizer, requires no vacuum system, easily achieves miniaturization, performs sample introduction in the form of gas, does not affect plasma stability thereof, has high sensitivity in metal element analysis, and is applicable to the analysis of a metal element in gas.

BRIEF DESCRIPTION OF THE DRAWINGS

FIG. 7 is table 1 showing the test results of the standard reference substance CGSE(6)1.

REFERENCE CHARACTERS

1—Peristaltic pump; 2—Reaction zone; 3—Reaction tube; 4—Sample solution; 5—Carrier solution; 6—Reducing agent; 7—Gas-liquid separator; 8—Hydride output tube; 9—Graphite electrode; 10—Hollow titanium tube anode; 11—Discharge region; 12—Cathode capillary tube; 13—Waste tube; 14—Electrolyte solution; 15—Waste bottle; 16—Gas flow controller; 17—Hydride generator; 21—Waste reservoir; 22—Ballast resistor.

DETAILED DESCRIPTION OF THE EMBODIMENTS

The present invention will be further described below with reference to the accompanying drawings and the following embodiments. It should be understood that the accompanying drawings and the following embodiments are only used for describing the present invention rather than limiting the present invention.

In view of the various defects existing in the conventional metal element analysis device, the present invention provides a microplasma apparatus suitable for analysis of metal elements in gas, comprising: a high-voltage power supply, a ballast resistor, a hollow metal anode, and a solution cathode. The hollow metal anode is connected to the positive electrode of the high-voltage power supply through the ballast resistor, the solution cathode is connected to the negative electrode of the high-voltage power supply through the graphite electrode, and the microplasma device is further configured in such a manner that: a discharge region is formed between the hollow metal anode and the solution cathode, and the hollow metal anode also serves as a sample introduction line, so that the gas to be tested enters the discharge region and is excited. According to the invention, direct gas sample introduction can be realized, and the metal element analysis sensitivity is improved.

The present invention will be further described in detail by way of exemplary embodiments with reference to the accompanying drawings.

Figure 1:
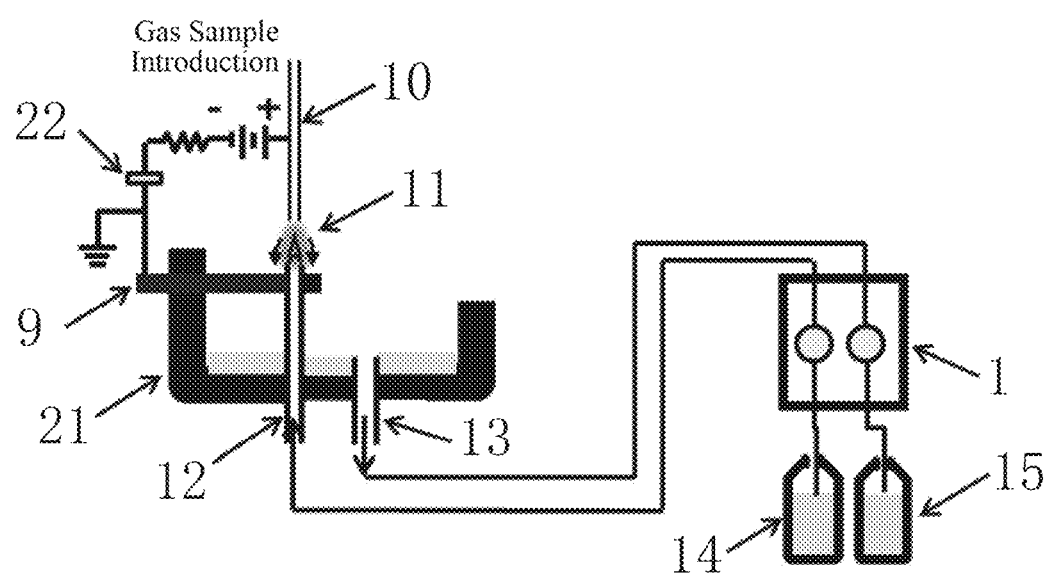
FIG. 1 is a schematic structural view of a microplasma apparatus suitable for analysis of metal elements in gas according to an embodiment of the present invention.

FIG. 1 is a schematic view of a microplasma apparatus suitable for analysis of a metal element in gas according to an embodiment of the present invention. As shown in FIG. 1, a BHK2000-0.1MG high-voltage source rated at 0.1 A and capable of supplying 0 to 2000 V DC voltage is used as the power supply to provide DC high voltage. A lead wire drawn from the positive electrode of the high-voltage source is connected to a hollow titanium tube anode 10 which serves as a hollow anode via a ballast resistor 22 having a resistance of 1-1.2 kΩ, and the negative electrode is connected to a graphite electrode 9. An electrolyte solution 14 is introduced from an electrolyte bottle by a peristaltic pump 1, and the electrolyte solution overflowing from a cathode capillary tube 12 serves as a solution cathode, and is connected to the negative electrode of the high-voltage power supply via the graphite electrode 9 to form the entire circuit of the glow device.

The hollow titanium tube anode 10 serves as a hollow anode, and also serves as a gas sample introduction line, so that the gas to be measured enters the glow discharge region and is excited. The hollow titanium tube anode 10 may have an inner diameter of 0.8-1.0 mm and an outer diameter of 2.0-2.5 mm. The sample gas is introduced into the hollow titanium tube anode 10 by, for example, argon as a carrier gas at a carrier gas flow rate of 50-150 mL/min. In addition, since the argon gas also has a cooling effect on the hollow titanium tube anode 10, it can prevent the anode from being overheated and damaged.

The hollow titanium tube anode 10 and the waste reservoir 21 are both fixed on a three-dimensional platform which could be adjusted in the X, Y, and Z directions, with an adjustment accuracy of 2 µm. The waste reservoir 21 is made of an acid-resistant, corrosion-resistant insulator material such as PTEF, and is located beneath the hollow titanium tube anode 10. The electrolyte may be an inorganic acid having a pH of 1, for example, one or more of nitric acid, hydrochloric acid, and sulfuric acid.

The electrolyte solution 14 in the electrolyte bottle is introduced into the cathode capillary tube 12 by a peristaltic pump 1, and the waste solution in the waste reservoir 21 is led by the same peristaltic pump 1 to the waste bottle 15 through a waste tube 13. The cathode capillary tube 12 is a glass capillary, which may have an inner diameter of 0.38 mm and an outer diameter of 1.1 mm. The top end of the cathode capillary tube 12 is kept at a distance of 3 to 4 mm from the bottom end of the hollow titanium tube anode 10, thereby forming a glow discharge region 11, into which the gas to be measured enters and is excited. The graphite electrode 9 horizontally penetrates the wall of the waste reservoir 21 and is fixed to one side of the waste reservoir 21. The cathode capillary tube 12 vertically penetrates the horizontally placed graphite electrode 9. The waste tube 13 may have an inner diameter of 2 mm and an outer diameter of 4 mm. The peristaltic pump is a common laboratory peristaltic pump.

Under normal pressure, the electrolyte solution serves as a cathode, and the hollow titanium tube anode 10 serves as an anode, and a high voltage is applied to the two electrodes, thereby causing gas discharge between the electrodes; thus the glow discharge is generated in the region between the hollow titanium tube anode 10 and the sample solution overflowing from the tip of the cathode capillary tube 12.

The testing process is performed in an atmospheric environment. The gas to be measured is introduced from the top of the hollow titanium tube anode 10 and reaches the discharge region 11. During the sample introduction, the plasma remains stable and is not extinguished. The inorganic acid electrolyte is driven by the peristaltic pump 1 into the cathode capillary tube 12 and continuously overflows. The peristaltic pump 1 is adjusted so that the catholyte flow rate is 1.0-2.1 mL/min, and the sample carrier gas flow rate is adjusted to 50-150 mL/min. After the high voltage is applied, the ignition is realized and the discharge is stabilized.

The microplasma apparatus suitable for the analysis of metal elements in the gas was combined with a lens and a spectrometer, for detecting $H_2Se$ produced by the hydrogenation of a Se solution several times. The result showed that the device has a good sensitivity, with a detection limit of $H_2Se$ at 0.2 ng/mL, and a signal RSD of less than 5%, the sensitivity being improved by 4 orders of magnitude compared to the solution cathode glow discharge microplasma (detection limit 2.6 µg/mL) using the liquid sample introduction method. Its application range is more extensive and it offers the possibility to use in combination with other instruments.

In the present invention, the anode material, the electrolyte solution, the peristaltic pump, the carrier gas, and the like are not limited to the above examples.

Figure 2:
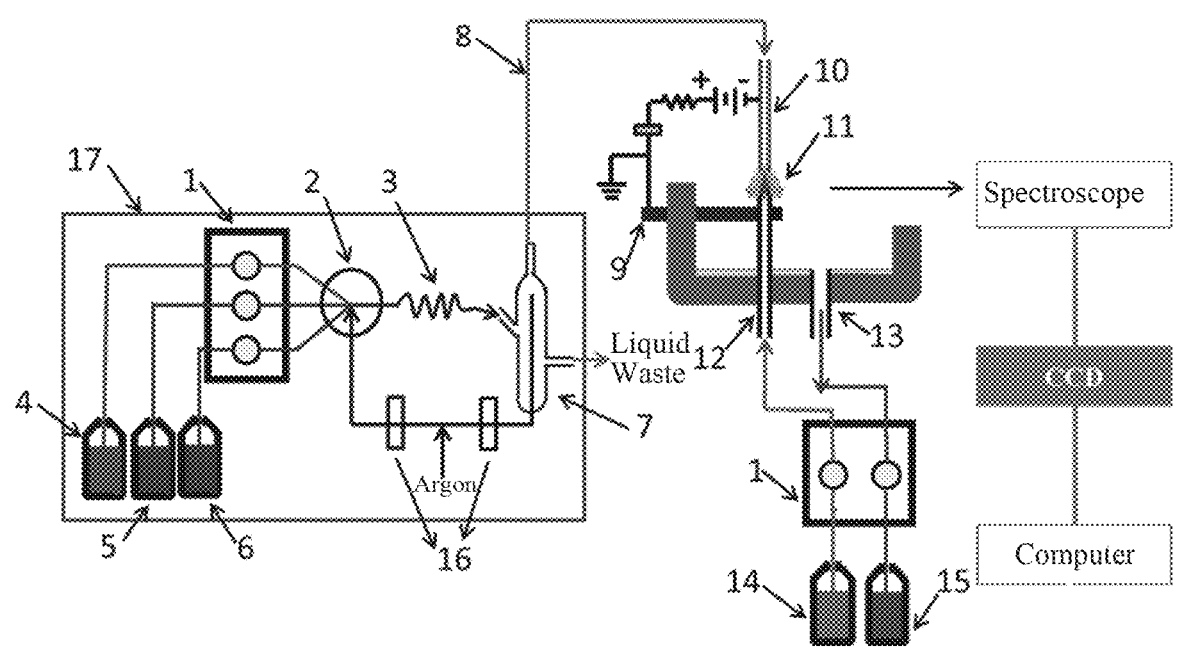
FIG. 2 is a schematic structural view of an apparatus for detecting a heavy metal element using a hydride generator and a solution cathode glow discharge spectrometer in combination according to an embodiment of the present invention.

FIG. 2 is a schematic structural view of an apparatus for detecting a heavy metal element using a hydride generator and a solution cathode glow discharge spectrometer in combination according to an embodiment of the present invention.

As shown in FIG. 2, the apparatus for detecting a heavy metal element using a hydride generator and a solution cathode glow discharge spectrometer in combination includes a hydride generator 17, a connection unit for combination of instruments, and a solution cathode glow discharge spectrometer unit.

The solution cathode glow discharge spectrometer unit may include four parts as follows: a light source generating part, a spectroscopic system, a detecting apparatus, and a data processing system. The light source generating part may include a high-voltage power supply, a ballast resistor, a three-dimensional platform, a hollow titanium tube anode 10, a peristaltic pump 1, a waste reservoir 21, a graphite electrode 9, a waste tube 13, and a cathode capillary tube 12 that vertically penetrates the graphite electrode 9.

Among them, the high-voltage power supply may use a BHK2000-0.1MG high-voltage source having a rated current of 0.1 A and capable of providing 0 to 2000 V DC high voltage. A lead wire drawn from the positive electrode of the high-voltage power supply is connected to the hollow titanium tube anode 10 via a ballast resistor; and the negative electrode is connected to the graphite electrode 9. The ignition of the experimental device requires a certain concentration of inorganic acid as the electrolyte solution. The electrolyte solution 14 is introduced into the cathode capillary tube 12 by the peristaltic pump 1, and the electrolyte solution overflowing from the top of the cathode capillary tube 12 is connected to the graphite electrode 9, and thus the entire circuit of the glow device is constituted. Under atmospheric pressure, after applying a high voltage to both electrodes, glow discharge microplasma is generated between the two electrodes to form a glow discharge region 11.

The electrolyte solution 14 may be one of inorganic acids such as nitric acid, hydrochloric acid, and sulfuric acid having a pH of 1. During the experiment, the flow rate of the peristaltic pump 1 may be adjusted to 1.0-2.1 mL/min so that the electrolyte solution 14 constantly overflows the top of the cathode capillary tube 12 of the solution cathode glow discharge spectrometer. The hollow titanium tube anode 10 also serves as a gas line. The hollow titanium tube anode 10 may have an inner diameter of 0.8-1.0 mm and an outer diameter of 2.0-2.5 mm. The sample gas is introduced into the hollow titanium tube anode 10 by using an inert gas such as argon or helium as a carrier gas. In addition, since the inert gas also has a cooling effect on the hollow titanium tube anode 10, the anode can be prevented from being overheated and damaged.

Preferably, the hollow titanium tube anode 10 and the waste reservoir 21 are both fixed on a three-dimensional platform which could be adjusted in the X, Y, and Z directions, with an adjustment accuracy of 2 μm. The waste reservoir 21 is made of an acid-resistant, corrosion-resistant insulator material such as polytetrafluoroethylene, and is located beneath the hollow titanium tube anode 10. The electrolyte solution 14 is introduced into the cathode capillary tube 12 by the peristaltic pump 1, and the waste liquid in the waste reservoir 21 is led out by the same peristaltic pump 1 via the waste tube 13.

The cathode capillary tube 12 may be a glass capillary with an inner diameter of 0.38 mm and an outer diameter of 1.1 mm. The top end of the cathode capillary tube 12 is kept at a distance of 3 to 4 mm from the bottom end of the hollow titanium tube anode 10, and thus a glow discharge region 11 is constituted, into which the gas to be measured enters and is excited. The graphite electrode 9 horizontally penetrates the wall of the waste reservoir and is fixed to one side of the waste reservoir. The cathode capillary tube 12 vertically penetrates the horizontally placed graphite electrode 9. The waste tube 13 may have an inner diameter of 2 mm and an outer diameter of 4 mm. The peristaltic pump 1 is an ordinary laboratory peristaltic pump.

In the solution cathode glow discharge spectrometer unit of the present invention, the spectroscopic system includes a condenser lens and a spectrometer, the center of the glow discharge region 11, the center of the condenser lens, and the center of the entrance slit of the spectrometer being on the same line to ensure that the emission spectrum generated by the discharge enters the entrance slit with minimal light loss.

The connection unit for combination of instruments comprises a hydride output tube 8 connected between the top of the hollow titanium tube anode 10 of the solution cathode glow discharge spectrometer and the gas-liquid separator 7 of the hydride generator 17. The hydride output tube 8 may be a plastic flexible hose, which can have an inner diameter of 0.33 cm and an outer diameter of 0.41 cm.

The hydride generator 17 includes four parts as follows: a sample introduction system, a reaction zone 2, a carrier gas flow control system, and a gas-liquid separator 7, wherein the sample introduction system includes a peristaltic pump 1, a sample conduit, a reducing agent conduit, and a carrier solution conduit. The carrier gas flow control system includes a carrier gas conduit and a gas flow controller 16.

During the experiment, under normal pressure, a sample solution 4, a reducing agent 6 and a carrier solution 5 are introduced into the reaction zone 2 through the same peristaltic pump 1 via the sample conduit, the reducing agent conduit, and the carrier solution conduit, respectively. Reaction takes place in reaction zone 2 to generate the corresponding hydride. The gas-liquid separator 7 in the hydride generator 17 separates the generated hydride from the reacted liquid. The generated hydride is carried by an inert gas (such as argon or helium, etc.) controlled by the gas flow controller 16, and is led out through the hydride output pipe 8 to the top of the hollow titanium tube anode 10 of the solution cathode glow discharge spectrometer and thus enters the discharge plasma of the glow discharge region 11.

During sample introduction, the plasma in the solution cathode glow discharge spectrometer remains stable and is not extinguished. The gaseous hydride entering the glow discharge region 11 from the top of the hollow titanium tube is excited and produces a characteristic emission spectrum. An appropriate object distance is selected within the range in which real images can be presented, and the generated characteristic emission spectrum line is introduced into the spectrometer by the lens to determine the content of heavy metals in the sample solution so as to realize the detection of heavy metal element ions. In addition, since the inert gas also has a cooling effect on the hollow titanium tube anode 10, the anode can be prevented from overheating and damaging.

The reducing agent solution during the experiment may be sodium borohydride or potassium borohydride solution, its medium may be 0.1 mol/L sodium hydroxide solution, and the carrier solution may be hydrochloric acid or other electrolyte acid.

In the present invention, the peristaltic pumps 1 are common laboratory peristaltic pumps. The types of peristaltic pumps, anode materials, and carrier gases are not limited thereto. The detection of the heavy metal element content in the sample solution includes the detection of hydride-forming elements such as Se, Te, Hg, As, Sb, Bi, Pb, and Sn in water, biological, and ore samples.

Now taking As and Hg as examples, the feasibility of the apparatus for detecting a heavy metal element using a hydride generator and a solution cathode glow discharge spectrometer in combination according to the present invention as well as the method for detecting heavy metal elements using the apparatus are described.

Figure 3:
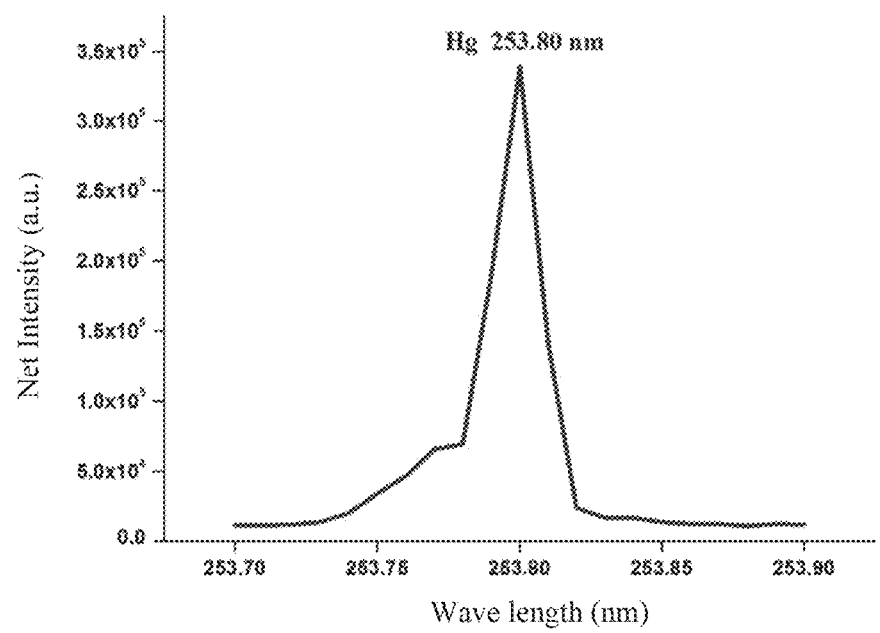
FIG. 3 is a characteristic emission spectrum of mercury element at 100 ng/mL obtained using the apparatus and the method of the present invention.
Figure 5:
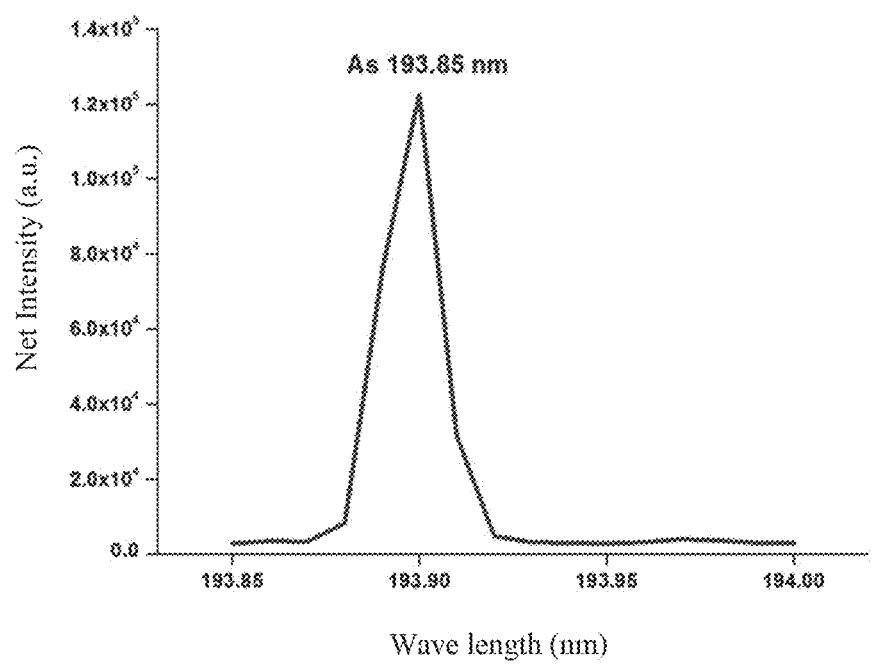
FIG. 5 is a characteristic emission spectrum of arsenic element at 10 µg/mL obtained using the apparatus and the method of the present invention.

FIG. 3 and FIG. 5 respectively show characteristic emission spectrums of 100 ng/mL Hg and 10 µg/mL As, wherein the ordinate represents the emission intensity, and the abscissa represents the wavelength range. As can be seen from FIG. 3 and FIG. 5, the characteristic line appears at the wavelengths of 253.8 nm and 193.85 nm for Hg and As, respectively, thus the feasibility of the detecting apparatus and the method of the present invention is verified.

Figure 4:
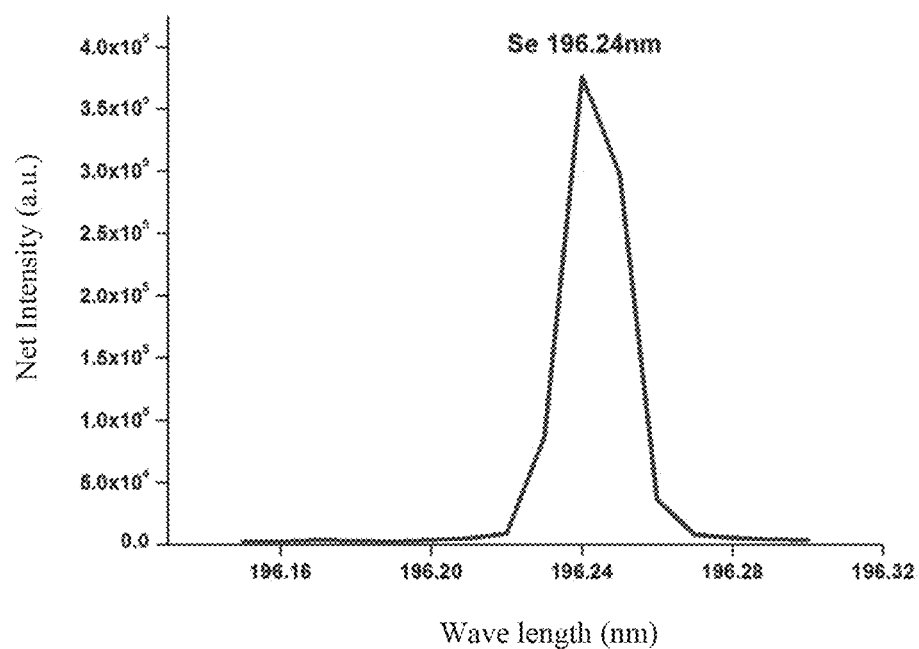
FIG. 4 is a characteristic emission spectrum of selenium element at 250 ng/mL obtained using the apparatus and the method of the present invention.
Figure 6:
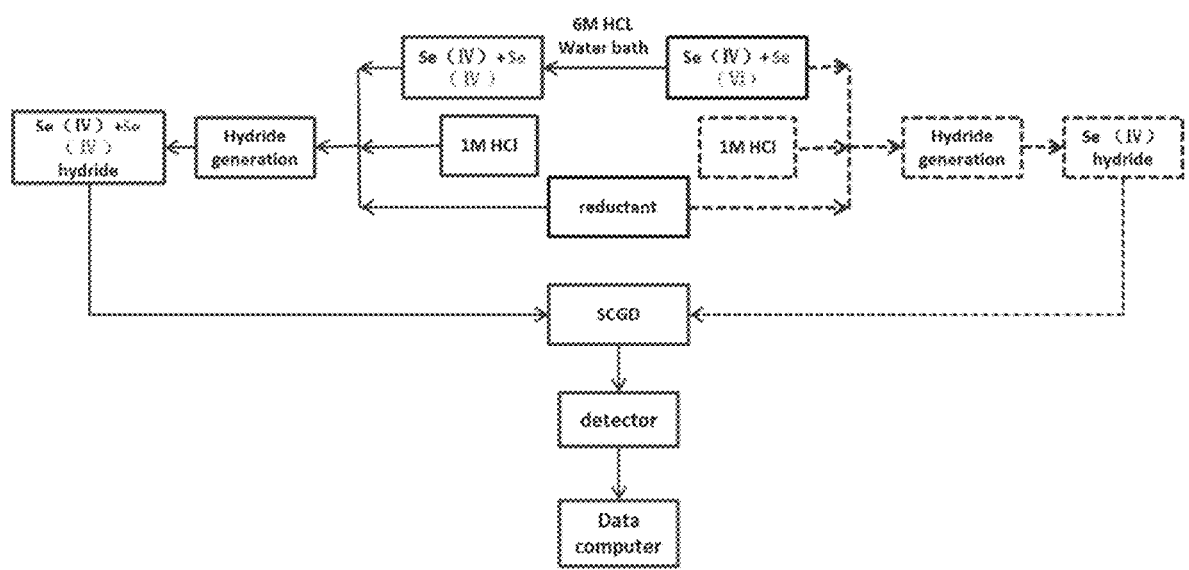
FIG. 6 is technology roadmap for a selenium element valence analysis using the apparatus and the method of the present invention.

Now, Se is taken as an example to explain the established valence analysis method. FIG. 6 is a selenium element valence analysis technology roadmap using the apparatus and the method of the present invention, and FIG. 4 is a characteristic emission spectrum of selenium at 250 ng/mL obtained using the apparatus and the method of the present invention. As shown in FIG. 6, when the carrier solution 5 is 1 mol/L HCl, the reducing agent 6 is 1.2% NaBH$_4$, and the carrier gas is argon at a flow rate of 110 mL/min, a 250 ng/mL Se(IV) solution can generate a corresponding hydride which enters into the glow discharge plasma and is excited. As shown in FIG. 4, the characteristic emission spectrum line is obtained at a wavelength of 196.24 nm; while a 50 µg/L Se(VI) solution cannot generate hydride and characteristic emission spectrum line under the same conditions. Therefore, when the sample was not pretreated, the content of Se(IV) was measured under this experimental condition; after the sample was water-washed for 30 min for reduction using 6 mol/L HCl, the total Se content was determined under this experimental condition, thus the valence analysis of Se is realized.

The standard reference material CGSE(6)1 shown in FIG. 7 is tested to verify the accuracy of the analysis method. The results are shown in Table 1. The accuracy of the method is proved to be good, and it is applicable to the valence analysis of Se. Since toxic heavy metal elements are converted into easily dissociable hydrides and directly enter the plasma, the atomization efficiency and transmission efficiency of the test element are greatly improved. A Se(IV) solution was tested several times using the apparatus which is a combination of a hydride generator and a solution cathode glow discharge spectrometer, and the test results showed that the detection limit of Se(IV) was reduced to 0.2 ng/mL, the signal RSD was less than 5%, and the sensitivity was increased 4000 times compared to the liquid sample introduction method (detection limit 0.8 µg/mL).

The apparatus of the present invention combines the advantages of the solution cathode glow discharge spectrometer and the hydride generator. The apparatus has the advantages of simple structure, convenient installation, convenient operation, and low cost, which laid the foundation for the combination of the solution cathode glow discharge spectrometer with other sample introduction technologies, and broadened the application prospects of practical sample analysis using the solution cathode glow discharge spectrometer.

The method of the present invention includes a method for detection and valence state analysis of heavy metal elements in a sample under normal pressure by using a combination of a solution cathode glow discharge spectrometer driven by a direct current and a hydride generator, which is simple in operation process, easy to implement, combines the advantages of solution cathode glow discharge and hydride generation, simplifies the sample pretreatment process, reduces the matrix effect, improves the detection sensitivity for the heavy metal elements, and expands the selectivity, and can achieve the detection of hydride-forming elements such as Se, Te, Hg, As, Sb, Bi, Pb, and Sn in the water, biological, and ore samples, as well as the analysis of the valence states of elements such as As, Se, and Hg.

The invention can be embodied in many forms without departing from the essential natures of the application, and the embodiments of the application are intended to be illustrative and not restrictive. The scope of the invention is defined by the claims rather than the specification, and all modifications which fall within the scope of the claims, or equivalents of the scope of the invention, are to be included in the claims.

INDUSTRIAL APPLICABILITY

The apparatus is simple, has a small volume, is convenient to install, consumes low power for running, is operated at atmospheric pressure, requires no nebulizer, requires no vacuum system, easily achieves miniaturization, performs sample introduction in the form of gas, does not affect plasma stability thereof, has high sensitivity in metal element analysis, and is applicable to the analysis of a metal element in gas. In addition, the apparatus of the present invention combines the advantages of the solution cathode glow discharge spectrometer and the hydride generator. The apparatus has the advantages of simple structure, convenient installation, convenient operation, and low cost, which laid the foundation for the combination of the solution cathode glow discharge spectrometer with other sample introduction technologies, and broadened the application prospects of the actual sample analysis of the solution cathode glow discharge spectrometer.

The invention claimed is:

1. A microplasma apparatus used for analysis of metal elements by means of gas sampling,
   comprising a high-voltage power supply, a ballast resistor, a hollow metal anode, a waste reservoir located beneath the hollow metal anode, and a solution cathode;
   the hollow metal anode being connected to a positive electrode of the high-voltage power supply by means of the ballast resistor, and the solution cathode being connected to a negative electrode of the high-voltage power supply by means of a graphite electrode;
   the microplasma apparatus being further configured in such a manner that a discharge region is formed between the hollow metal anode and the solution cathode, and the hollow metal anode also serves as a sample introduction pipe so that the gas to be tested enters the discharge region and is excited;
   the solution cathode being an electrolyte solution introduced into a cathode capillary tube through a peristaltic pump and overflows the cathode capillary tube;
   the top end of the cathode capillary tube being kept at a distance of 3 to 4 mm from the bottom end of the hollow metal anode;
   the graphite electrode horizontally penetrating a wall of the waste reservoir and being fixed to one side of the waste reservoir; and
   the cathode capillary tube vertically penetrating the graphite electrode.

2. The microplasma apparatus used for analysis of metal elements by means of gas sampling according to claim 1, wherein
the hollow metal anode is a hollow titanium tube.

3. The microplasma apparatus used for analysis of metal elements by means of gas sampling according to claim 2, wherein
the gas to be tested is carried by an inert gas as a carrier gas into the hollow metal anode.

4. The microplasma apparatus used for analysis of metal elements by means of gas sampling according to claim 1, wherein
the waste liquid in the waste reservoir is led out through the waste tube by a peristaltic pump.

5. The microplasma apparatus used for analysis of metal elements by means of gas sampling according to claim 4, wherein
the cathode capillary tube is a glass capillary with an inner diameter of 0.38 mm and an outer diameter of 1.1 mm;
the waste tube has an inner diameter of 2-3 mm and an outer diameter of 4-5 mm;
the hollow metal anode has an inner diameter of 0.8-1.0 mm and an outer diameter of 2.0-2.5 mm;
the peristaltic pump is adjusted to provide a solution cathode flow rate of 1.0-2.1 mL/min; and
the flow rate of the gas to be tested is adjusted to 50-150 mL/min.

6. The microplasma apparatus used for analysis of metal elements by means of gas sampling according to claim 1, wherein
the high-voltage power supply adopts a high-voltage source capable of supplying 0-2000 V DC voltage with a rated current of 0.1 A; and
the ballast resistor has a resistance of 1-1.2 kΩ.

7. The microplasma apparatus used for analysis of metal elements by means of gas sampling according to claim 1, wherein
the hollow metal anode and the waste reservoir are fixed on a three-dimensional platform which can be adjusted in the X, Y, and Z directions, with an adjustment accuracy of 2 μm.

8. An apparatus for detecting heavy metal elements, comprising a hydride generator unit, a solution cathode glow discharge spectrometer unit, and a connecting unit connecting the hydride generator unit and the solution cathode glow discharge spectrometer unit; wherein
the solution cathode glow discharge spectrometer unit is configured in such a manner that an electrolyte solution serves as the cathode and a hollow titanium tube serves as the anode, and glow discharge microplasma is generated between the two electrodes after a high voltage is applied to the two electrodes;
the hydride generator unit generates a hydride of the heavy metal element to be detected from a test sample; and
the hydride of the heavy metal element to be detected generated by the hydride generator unit is sent to the hollow titanium tube anode via the connecting unit, and is led from the hollow titanium tube anode to the glow discharge microplasma and is excited, and thus a characteristic emission spectrum is generated.

9. The apparatus according to claim 8, wherein
the solution cathode glow discharge spectrometer unit includes four parts as follows: a light source generating part, a spectroscopic system, a detecting apparatus, and a data processing system, wherein the light source generating part includes a high-voltage power supply, a ballast resistor, a three-dimensional platform, a hollow titanium tube anode, a peristaltic pump, a waste reservoir, a graphite electrode, a sample introduction tube, and a waste tube; and the sample introduction tube includes a cathode glass capillary that vertically penetrates the graphite electrode;
the hydride generator unit includes a sample introduction system, a reaction zone for generating the hydride of the heavy metal element to be tested by reacting the reaction solution delivered by the sample introduction system, a gas-liquid separator for separation of the hydride of the heavy metal element to be tested from the reacted liquid, and a carrier gas flow control system for controlling a carrier gas for carrying the hydride of the heavy metal element to be tested; and the connecting unit includes a transmission pipe which is connected between the top of the hollow titanium tube anode of the solution cathode glow discharge spectrometer unit and the gas-liquid separator of the hydride generator unit, having an inner diameter of 0.3-0.35 cm and an outer diameter of 0.38-0.43 cm.

10. The apparatus according to claim 9, wherein
the sample introduction system includes a peristaltic pump, a sample conduit, a reducing agent conduit, and a carrier solution conduit; and the sample to be tested, the reducing agent, and the carrier solution are introduced into the reaction zone through the peristaltic pump via the sample conduit, the reducing agent conduit, and the carrier solution conduit, respectively; and
the carrier gas flow control system includes a carrier gas conduit connected between the top of the hollow titanium tube and the gas-liquid separator, and a gas flow controller for controlling the gas flow within the carrier gas conduit.

11. A method for detecting heavy metals using the apparatus of claim 8, comprising the steps of:
providing a sample solution, a carrier solution, and a reducing agent solution, and making them react in the hydride generator unit to generate a gas hydride;
introducing the generated gas hydride into the hollow titanium tube anode of the solution cathode glow discharge spectrometer by the carrier gas;
providing an electrolyte solution, adjusting the flow rate of the peristaltic pump, and overflowing the electrolyte solution continuously from the top of the cathode capillary tube of the solution cathode glow discharge spectrometer unit;
applying a high voltage to the electrolyte solution which serves as the cathode and the hollow titanium tube which serves as the anode in the solution cathode glow discharge spectrometer unit under atmospheric pressure such that the gas hydride is excited, thereby generating a characteristic emission spectrum; and
selecting an appropriate object distance within the range of presenting real images, introducing the characteristic emission spectrum line generated into the spectrometer by the lens, and detecting the content of heavy metal elements in the sample solution to be tested to realize detection of heavy metal element ions.

12. The method according to claim 11, wherein
the reducing agent solution is sodium borohydride or potassium borohydride solution, and the medium of the reducing agent solution is 0.1 mol/L sodium hydroxide solution;
the carrier solution is electrolyte acid; and the heavy metal elements able to be tested include Se, Te, Hg, As, Sb, Bi, Pb, and Sn hydrogenated elements in water, biological, and ore samples.

* * * * *